United States Patent

[11] 3,609,275

| [72] | Inventors | Daniel F. T. Roberts<br>Bexley;<br>Terence R. Wilkins, Northolt; John<br>Graham, Hartlepool, all of England |
|---|---|---|
| [21] | Appl. No. | 13,469 |
| [22] | Filed | Feb. 24, 1970 |
| [45] | Patented | Sept. 28, 1971 |
| [73] | Assignee | Foster Wheeler Corporation<br>Livingston, N.J. |

[54] BUTT WELDING OF TUBE PLATES AND THE LIKE
6 Claims, 5 Drawing Figs.

[52] U.S. Cl. .................................................. 219/60 A,
 219/137
[51] Int. Cl. .................................................. B23k 11/06
[50] Field of Search ...................................... 219/60, 61,
 137, 130, 136

[56] References Cited
UNITED STATES PATENTS

| 1,869,351 | 7/1932 | Lincoln | 219/61 |
| 1,884,714 | 10/1932 | Jerabek | 219/137 |
| 3,118,047 | 1/1964 | Johnson | 219/137 X |
| 3,180,965 | 4/1965 | Kitvell | 219/61 |

*Primary Examiner*—J. V. Truhe
*Assistant Examiner*—J. G. Smith
*Attorneys*—John Maier, III, Marvin A. Naigur and John E. Wilson

ABSTRACT: The invention relates to the butt-welding of parts such as tubes, plates or the like. When such parts are butt-welded using a filler wire, it often happens that this will break or snap out of position and so cause a faulty weld. According to the invention, the welding torch has a heat-resisting shoe or roller which resiliently bears against the filler wire closely in front of that part of the wire being melted by the arc so retaining the wire in position.

PATENTED SEP 28 1971
3,609,275
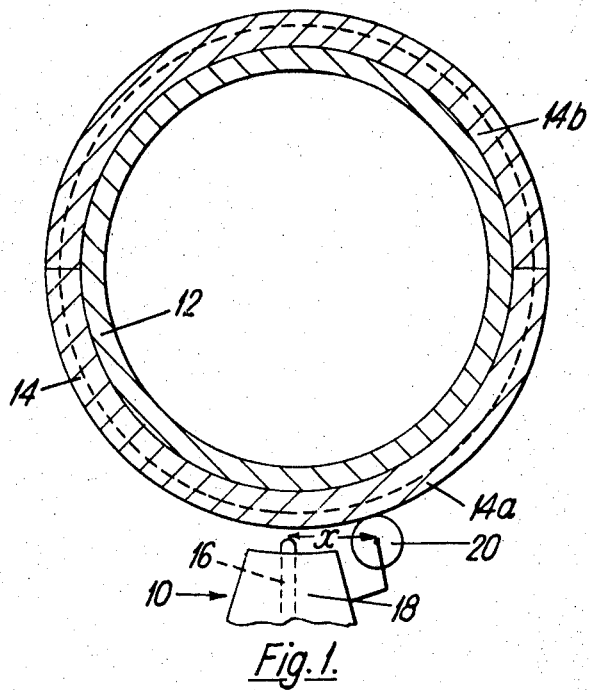
Fig.1.
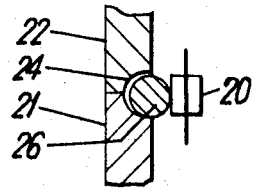
Fig.2.
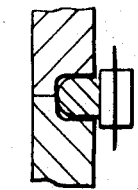
Fig.3.
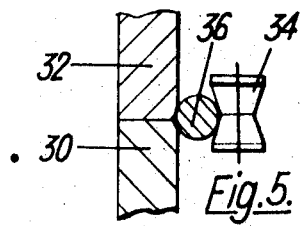
Fig.4.
Fig.5.

BUTT WELDING OF TUBE PLATES AND THE LIKE

This invention relates to improvements in the butt-welding of parts such as tubes and plates and is especially concerned with butt-welding using nonconsumable electric arc torch and a filler wire in register with the joint which is melted during the welding operation.

BACKGROUND TO THE INVENTION

It is found that during such welding operations there is considerable difficulty in achieving a uniform weld because the wire can easily become displaced. Also there is always the possibility that a length of the wire, mostly the last part to be welded, will become displaced and fall away from the joint with the result that a gap in the filler is left and the weld is unsatisfactory until further filler wire is inserted into the gap and that part of the joint rewelded. This is itself undesirable and in addition problems of access often make it very difficult to insert further filler wire into the gap.

A number of ways of overcoming this problem have been tried but without successes. In the case of the butt-welding of tubes, if the filler wire is tack welded in place at a number of locations around the tubes this is rather surprisingly found to make matters worse, probably because the strains produced in the wire by the tack welds cause the wire to spring out of location quite erratically. Also if the wire is arranged to be sprung in place around a tube then again the strains involved seem to be capable of causing parts of the wire to spring out of location in a completely eratic and random fashion.

The invention has therefore been made with these problems in mind and it is an object of the invention to provide a simple way of overcoming these problems.

THE INVENTION

According to the invention there is provided a method of butt-welding parts such as tubes, plates and the like, in which a filler wire to be fused with the joint during welding is placed in register with the butted parts and a butt-weld is made using a nonconsumable electrode electric arc welding torch, a heat-resisting member such as a shoe or roller resiliently bearing against the filler wire closely in front of that part of the wire being melted by the arc so as to hold the wire in place throughout the tracking of the torch to completion of the weld.

It is found that this simple expedient overcomes the problems of the wire becoming displaced during a welding operation, even if the wire is initially sprung or tack-welded in position. It is very much preferred, however, for the wire not to be subjected to such strains when following the invention and so the wire should not be tack-welded in place and should preferably be a simple fit between the parts or around or within butted tubes. Also the wire is preferably annealed before use so as to eliminate any strains as far as is possible.

According to a further aspect of the invention there is provided a nonconsumable electrode electric arc welding torch having a welding head carrying the nonconsumable electrode which is arranged to be tracked around or along the region to be welded so as to prepare a butt-welded joint between butted parts such as tubes, plates or the like, the welding head also carrying a heat-resisting resiliently mounted shoe or roller which is arranged to press a filler wire placed in register with the butted parts into contact with the weld region during the tracking of the head during a welding operation.

The shoe or roller slide or roll easily over the surface of the filler wire since a large friction force could itself tend to cause the wire to slide around the tubes and the wire could break away from the initially melted part of the wire as soon as movement of the head has started. For these reasons it is preferred to use a small roller rather than a shoe. Also the pressing force which the shoe or roller exerts on the wire need not be large.

The shoe or roller must be made of a heat-resisting material such as a heat-resisting chromium steel or a refractory material such as alumina. Also it may be cooled, e.g. by water cooling.

The butted tubes or other parts can have a weld preparation in their butted faces to accommodate or partially accommodate the filler wire or their butted faces may be plain. In the latter case the shoe or roller may be specially shaped so as to guide the filler wire and retain it in the desired position. On the other hand in the former case, the shoe or roller can be shaped or can have a flat cylindrical face contacting the wire and so simply press the wire towards the tubes.

The shoe or roller should press on the wire close to the point of fusion. In practice the nearest the shoe or roller can press on the wire is a spacing of about 1 mm. from the electrode. On the other hand the shoe or roller should not be further than about 20 mm. from the electrode where it presses against the wire. A convenient spacing has been found to be about 10 mm.

In the case of the butt-welding of tubes the filler wire can conveniently be made in two semicircular parts which are fitted around or within the butted tubes before welding.

The composition of the filler wire must be chosen in the normal way so as to ensure that the composition of the weld is not subject to brittle fracture.

The invention is applicable to the butt-welding of tubes both from the outside of the tubes and from the inside of the tubes, and by the term butt-welding of tubes we mean both the butt-welding of one tube to another tube and the butt-welding of one tube to a short stub or other preparation formed on a header or tube plate, or the direct butt-welding of a tube to a tube plate surface.

The size of the filler wire does not appear to be critical and good results have been achieved using wires with a cross-sectional areas of from 0.0008 to 0.030 inch$^2$.

The invention is applicable to all cases of butt-welding of tubes but can be used with particular advantage in cases where access for welding is a problem since the chance of a faulty weld being formed is relatively remote.

DESCRIPTION OF THE DRAWINGS

The invention will now be illustrated, by way of example, with reference to the accompanying diagrammatic drawings, in which:

FIG. 1 is a cross section through a pair of tubes being butt-welded according to the invention;

FIG. 2 is a part axial section through arrangement shown in FIG. 1;

FIGS. 3 and 5 are sections similar to FIG. 2 of modified embodiments according to the invention; and FIG. 4 is a section through a further modified form of filler wire.

DESCRIPTION OF THE PREFERRED EMBODIMENTS

In FIG. 1 is shown the head 10 of a welding torch which is positioned ready to weld a tube 12 to another butted tube not shown. The ends of the tubes have been prepared with grooves 24 that a filler wire 14 fits within the groove so formed. As can be seen the filler wire has been formed in two semicircular parts 14a and 14b for ease of fitting around the tubes. As noted above the wire 14 has been annealed so as to remove large internal strains.

The welding head 10 includes a nonconsumable electrode 16 positioned within an inert gas outlet hood 18. It carries a small ceramic roller 20 which is resiliently urged into contact with the outer circumference of the wire 14 and retains this in place in the groove formed by butting the tubes.

As the head 10 is orbited around the tubes during welding the small roller 20 precedes the arc and maintaining the wire in its correct location, the speed of the head and the arc intensity being of course those required to fuse the filler wire and give complete fusion of the joint.

The spacing between the electrode 16 and roller 20 i.e. the distance $x$ should not normally exceed 20 mm. and is desirably about 10 mm., so as to ensure that the wire 14 does not snap or parts of it drop out of the groove.

In FIG. 2 is shown a suitable weld preparation. Here two tubes 21 and 22 are butted and their ends have been shaped so that their butting defines a groove 24 into which a roughly circular filler wire 26 is filled. The roller 20 on the welding head is also shown.

In FIG. 3 a slightly different shape of weld preparation and correspondingly different cross-sectional shape of filler wire is shown. Further in FIG. 4 another different cross section of filler wire is shown. Any convenient cross section may be selected.

In the embodiments of FIGS. 2 and 3 the roller 20 is cylindrical in shape and merely presses the wire into the groove formed by the abutting of the tubes. In the embodiment of FIG. 5, however, the ends of the butting tubes 30 and 32 have not been prepared or at the most have a slight taper in their external surface, and the roller 34 is of double frustoconical shape and so serves both to press the filler wire 36 against the joint of the tube both and to position the wire correctly with respect to the joint.

Naturally the roller 34 could also be used with the preparations shown in FIGS. 2 and 3.

In each of the embodiments just described the tubes have been simply butted together before welding. The invention is, however, equally applicable to the case where the welds between the tubes have been made in a number of passes. Thus in a first pass fusion of the root of the weld might be effected and then a filler wire inserted in the groove which remains and a second welding pass made using a roller to retain the filler wire in place as described above.

No matter how the tubes are welded, however, if a filler wire is used in at least one welding pass, one can with advantage mount a small roller or shoe on the welding head in accordance with the invention to retain the filler wire in place.

An important advantage of this invention is its simplicity.

A latitude of change, modification and substitution is intended in the foregoing disclosure and in some instances some features of the invention will be employed without a corresponding abuse of other features. Accordingly, it is appropriate that the appended claims be construed broadly and in a manner consistent with the spirit and scope of the invention herein.

We claim:

1. A method of butt-welding two tubular parts of circular cross section at the ends thereof, using a nonconsumable electrode electric arc welding torch comprising the steps of:
    placing a curved filler wire to be fused with the joint during welding in contact over its entire length with each of the ends of said butted parts,
    bearing a heat-resisting member against said filler wire closely in front of and within 20 mm. of said nonconsumable electrode so as to hold the said filler wire in a place,
    while simultaneously moving said torch relative to said butted parts to make a fusion weld with said nonconsumable electrode electric arc welding torch and continuing such bearing of said heat-resisting member against said filler wire so as to retain said filler wire in place throughout the making of said butt-weld.

2. A method according to claim 1 in which said filler wire is a simple fit against said parts being welded.

3. A method according to claim 1 in which said filler wire has been annealed before use so as to eliminate any strains as far as possible.

4. A method according to claim 1 in which said heat-resisting member bears against said wire at a spacing of about 10 mm. from said electrode.

5. A method according to claim 1 in which said filler wire is in the form of two semicircular halves which are fitted in register with said tubes before welding.

6. A method according to claim 1 in which said filler wire has a cross-sectional area of from 0.0008 to 0.030 inch$^2$.